No. 811,957. PATENTED FEB. 6, 1906.
C. RYSTROM.
LOCK NUT.
APPLICATION FILED MAR. 16, 1903.

UNITED STATES PATENT OFFICE.

CHARLES RYSTROM, OF ROCKFORD, ILLINOIS.

LOCK-NUT.

No. 811,957.

Specification of Letters Patent.

Patented Feb. 6, 1906.

Application filed March 16, 1903. Serial No. 147,992.

*To all whom it may concern:*

Be it known that I, CHARLES RYSTROM, a citizen of the United States, residing at Rockford, in the county of Winnebago and State of Illinois, have invented certain new and useful Improvements in Lock-Nuts, of which the following is a specification.

This invention relates to improvements in lock-nuts in which the nut is composed of spiral coils, the coils being compressed while being internally threaded; and my improvements relate to means for holding the coils compressed after being threaded and forms a part of the nut until the nut is placed on the bolt, when the clamping means are removed and the coils allowed to exert pressure on the threads of the bolt.

Figure 1:
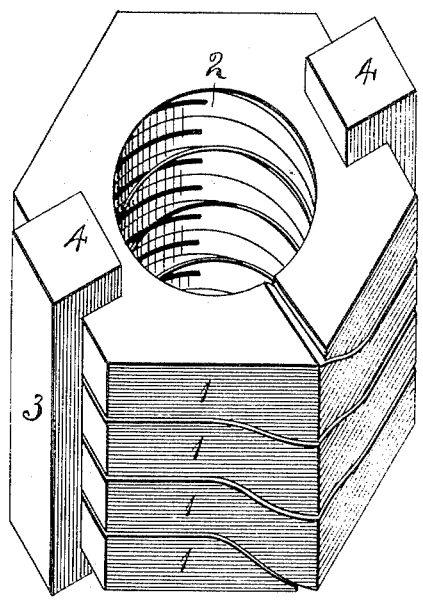
Figure 2:
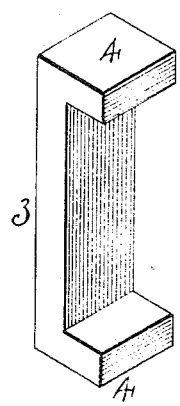

In the accompanying drawings, Figure 1 is an isometrical representation of a lock-nut with my clamping means in connection therewith. Fig. 2 is an isometrical representation of one of the clamping devices.

The lock-nut is the same as that patented to Charles H. Smith, No. 653,852, dated July 17, 1900, being made up of coils 1 in spiral form, and when coiled the coils are somewhat open. The nut is then placed in a clamping device, and the coils are pressed together and the central opening 2 screw-threaded, and when the clamping device is removed the coils will assume their normal position.

After the central opening has been screw-threaded and after the clamping device has been removed I place in this instance two clamping-bars 3 (shown at Fig. 2) on the nut, so that the hooked ends 4 will engage the ends of the nut, as shown at Fig. 1. The clamping device is then removed, and the clamps will hold the coils of the nut compressed. These clamping-bars form a part of the nut until the nut is turned on the bolt nearly into position. When the clamping-bars are removed and a wrench applied to the nut, it may be turned hard up against the work. The spring force of the coils of the nut is sufficient to prevent the loosening of the nut, and considerable force is required to turn it. It is necessary to hold the coils of the nut compressed until the coils have engaged a thread of the bolt. Otherwise the threads of the nut would become crossed with the threads of the bolt, and it could not be turned on.

I claim as my invention—

1. As a new article of manufacture, a lock-nut composed of a spirally-coiled body having flattened outer faces an internal screw-threaded opening, the coils in their normal position being separated, and means carried by the nut for holding the coils compressed.

2. As a new article of manufacture, a lock-nut composed of a spirally-coiled body having an internal screw-threaded opening the coils of which normally tend to separate and in which position they are out of register, and removable clips carried by opposite sides of the nut normally tending to hold the coils compressed and the threads in continuous register.

3. As a new article of manufacture, a resilient, spirally-coiled body having an internal screw-threaded opening and having external flattened portions, and a plurality of removable clips holding said coiled body in a compressed condition, each of said clips being flattened on its outer side and bearing internally against one of the flattened portions of said coiled body.

4. As a new article of manufacture, a lock-nut comprising a compressible and expansible spirally-coiled body having an internal screw-threaded opening; the threads of which are continuous when the coils are compressed and broken when the coils are expanded, said nut being adapted for application to a bolt only when the coils are compressed, and means forming a part of the article and engaging the ends thereof for holding the coils of the nut compressed and the threads continuous so that the nut may be applied to a bolt, said means being removable to permit the coils of the nut to expand.

CHARLES RYSTROM.

Witnesses:
A. O. BEHEL,
E. BEHEL.